(12) United States Patent
Lee et al.

(10) Patent No.: US 10,578,105 B2
(45) Date of Patent: Mar. 3, 2020

(54) ELECTRIC COMPRESSOR

(71) Applicant: Hanon Systems, Daejeon (KR)

(72) Inventors: Young Hun Lee, Daejeon (KR); Eun Seok Kang, Daejeon (KR); Tae Hyeong Kim, Daejeon (KR); Sung Jun Park, Daejeon (KR); Hee Kwon Park, Daejeon (KR); Seung Hwan Shin, Daejeon (KR); Min Gyo Jung, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 15/547,628

(22) PCT Filed: Aug. 22, 2016

(86) PCT No.: PCT/KR2016/009237
§ 371 (c)(1),
(2) Date: Jul. 31, 2017

(87) PCT Pub. No.: WO2017/057848
PCT Pub. Date: Apr. 6, 2017

(65) Prior Publication Data
US 2018/0266420 A1 Sep. 20, 2018

(30) Foreign Application Priority Data

Oct. 2, 2015 (KR) .................. 10-2015-0139019
Jan. 29, 2016 (KR) .................. 10-2016-0011764

(51) Int. Cl.
*F04C 23/00* (2006.01)
*F04C 18/02* (2006.01)
(Continued)

(52) U.S. Cl.
CPC ............ *F04C 23/008* (2013.01); *F04B 35/04* (2013.01); *F04B 39/121* (2013.01);
(Continued)

(58) Field of Classification Search
CPC ............... F04C 18/0215; F04C 23/008; F04C 2240/30; F04C 2240/803; F04C 2240/808;
(Continued)

(56) References Cited

U.S. PATENT DOCUMENTS

| 6,619,933 B2* | 9/2003 | Ikeda ................. F04B 39/06 |
| | | 417/410.1 |
| 2012/0237376 A1* | 9/2012 | Kinoshita ............. F01C 21/10 |
| | | 417/423.7 |
| 2015/0056086 A1* | 2/2015 | Yano ................... F04C 18/02 |
| | | 417/410.5 |

FOREIGN PATENT DOCUMENTS

| CN | 103486000 A | 1/2014 |
| KR | 20130026291 A | 3/2013 |

(Continued)

OTHER PUBLICATIONS

International Search Report issued in PCT/KR2016/009237 dated Nov. 21, 2016.

*Primary Examiner* — Peter J Bertheaud
(74) *Attorney, Agent, or Firm* — Norton Rose Fulbright US LLP

(57) ABSTRACT

Disclosed herein is a motor-driven compressor with an inverter that is connected with an external power source via a connector part and controls a driving part which drives a compressing part to compress fluid. A printed circuit board is provided between the connector part and the driving part. Thus, noise transmitted from the driving part to the connector part is reduced, so that it is possible to minimize the transmission of the noise to an external power source.

7 Claims, 6 Drawing Sheets

(51) Int. Cl.
*H02K 5/22* (2006.01)
*H02K 11/33* (2016.01)
*F04B 39/12* (2006.01)
*F04B 35/04* (2006.01)

(52) U.S. Cl.
CPC ......... *F04C 18/0215* (2013.01); *H02K 5/225* (2013.01); *H02K 11/33* (2016.01); *F04C 2240/30* (2013.01); *F04C 2240/803* (2013.01); *F04C 2240/808* (2013.01)

(58) Field of Classification Search
CPC ....... F04B 35/04; F04B 39/121; H02K 5/225; H02K 11/33
See application file for complete search history.

(56) References Cited

FOREIGN PATENT DOCUMENTS

| KR | 101290863 | B1 | 7/2013 |
|----|-----------|----|--------|
| KR | 20130094656 | A | 8/2013 |
| KR | 101364349 | B1 | 2/2014 |
| KR | 101422320 | B1 | 7/2014 |

* cited by examiner

ELECTRIC COMPRESSOR

This application is a 371 of International Application No. PCT/KR2016/009237 filed Aug. 22, 2016, which claims priority from Korean Patent Application Nos. 10-2015-0139019 filed Oct. 2, 2015 and 10-2016-0011764 filed Jan. 29, 2016.

TECHNICAL FIELD

Exemplary embodiments of the present invention relates to a motor-driven compressor, and more particularly, to a motor-driven compressor with an inverter that is connected with an external power source via a connector part and controls a driving part which drives a compressing part to compress fluid.

BACKGROUND ART

Generally, a compressor used in an air conditioner of a vehicle receives refrigerant from an evaporator, converts the refrigerant into high-temperature and high-pressure gas and then supplies the gas to a condenser.

Examples of the compressor used in the air conditioner of the vehicle include a swash plate type compressor that is driven by a driving force transmitted from an engine, a motor-driven compressor that compresses fluid by rotating a scroll using a motor, and others. The motor-driven compressor includes the motor therein, and further includes an inverter to control the motor, so that refrigerant is compressed by driving the motor under the operation control of the inverter.

FIG. 1 illustrates an inverter-integrated motor-driven compressor. The inverter-integrated motor-driven compressor is configured such that the inverter for driving the motor is integrated into the motor-driven compressor, and is widely used to compress the refrigerant in a cooling system for a vehicle. The inverter-integrated motor-driven compressor includes a driving part 150, a compressing part 160, and an inverter.

In the conventional inverter-integrated motor-driven compressor illustrated in FIG. 1, a connector 120 of the inverter is provided on a side of the driving part 150 with respect to a printed circuit board 110, and is mounted to face the driving part 150 with respect to an axial direction of the driving part 150.

In this structure, the connector 120 is mounted near to the driving part 150, and noise generated from the driving part 150 is transmitted through the connector 120 to a battery. Since the driving part 150 generates vibration by rotation and generates a magnetic field due to a magnetic-field induction phenomenon, a neighboring electronic component is affected by vibration noise and the magnetic field.

Further, a power device 130 is located on a side of the driving part 150 on the printed circuit board 110. Here, since the connector 120 is located in the same direction as the power device 130 with respect to the printed circuit board 110, the connector is affected by electromagnetic noise that is generated from the power device 130.

That is, a conventional compressor is problematic in that the connector 120 of the inverter is located in the same space where noises of the driving part 150 and the power device are directly coupled, so that the connector is directly affected by noise outputted from the driving part 150, and the noise is outputted to an external device such as the battery.

DISCLOSURE

Technical Problem

Accordingly, the present invention has been made keeping in mind the above problems occurring in the related art, and an aspect of the present invention is directed to a motor-driven compressor, which is capable of minimizing noise transmitted from a motor or a power device through a connector and a harness to an external device.

Technical Solution

In order to accomplish the object, the present invention provides a motor-driven compressor with an inverter that is connected with an external power source via a connector part and controls a driving part which drives a compressing part to compress fluid, wherein a printed circuit board is provided between the connector part and the driving part.

The connector part may extend in an axial direction of the driving part and may protrude towards an opposite side of the driving part.

The compressing part may be provided in front of the driving part in the axial direction of the driving part, and the printed circuit board and the connector part may be provided in back of the driving part.

A power device and the connector part may be provided on opposite sides of the printed circuit board.

A high voltage filter and the connector part may be provided on opposite sides of the printed circuit board.

The connector part may be provided outside an outer surface of the driving part with respect to a rotation center of the driving part.

The connector part may be provided outside the printed circuit board in a direction crossing the rotation center of the driving part.

The connector part may be provided inside the outer surface of the driving part with respect to the rotation center of the driving part.

The connector part may be provided inside the printed circuit board in a direction crossing the rotation center of the driving part.

The printed circuit board may be provided in an inverter housing, the inverter housing may include a housing part coupled to a compressor housing and a cover part covering the housing part, and the connector part may be provided on the cover part of the inverter housing.

The connector part may include a high voltage connector and a low voltage connector.

The low voltage connector may be provided on either a left side or a right side of the high voltage connector, and may be provided at a position where a low voltage part may be located, among a high voltage part and the low voltage part provided on the printed circuit board.

Advantageous Effects

As described above, a motor-driven compressor according to the present invention is advantageous in that the withdrawl position of a high voltage connector and a low voltage connector is provided opposite to a motor and a power device with respect to a printed circuit board, thus preventing noise from being transmitted from the motor or the power device through the connector and a harness to an external power source such as a battery of a vehicle or minimizing the transmission of the noise.

MODE FOR INVENTION

Hereinafter, preferred embodiments of the present invention will be described in detail with reference to accompanying drawings.

Referring to FIGS. 2 to 5, an inverter of a motor-driven compressor according to an embodiment of the present invention includes a printed circuit board 10 on which an electronic component is mounted, and a connector part 20 that supplies external power to a component of the printed circuit board 10.

Figure 4:
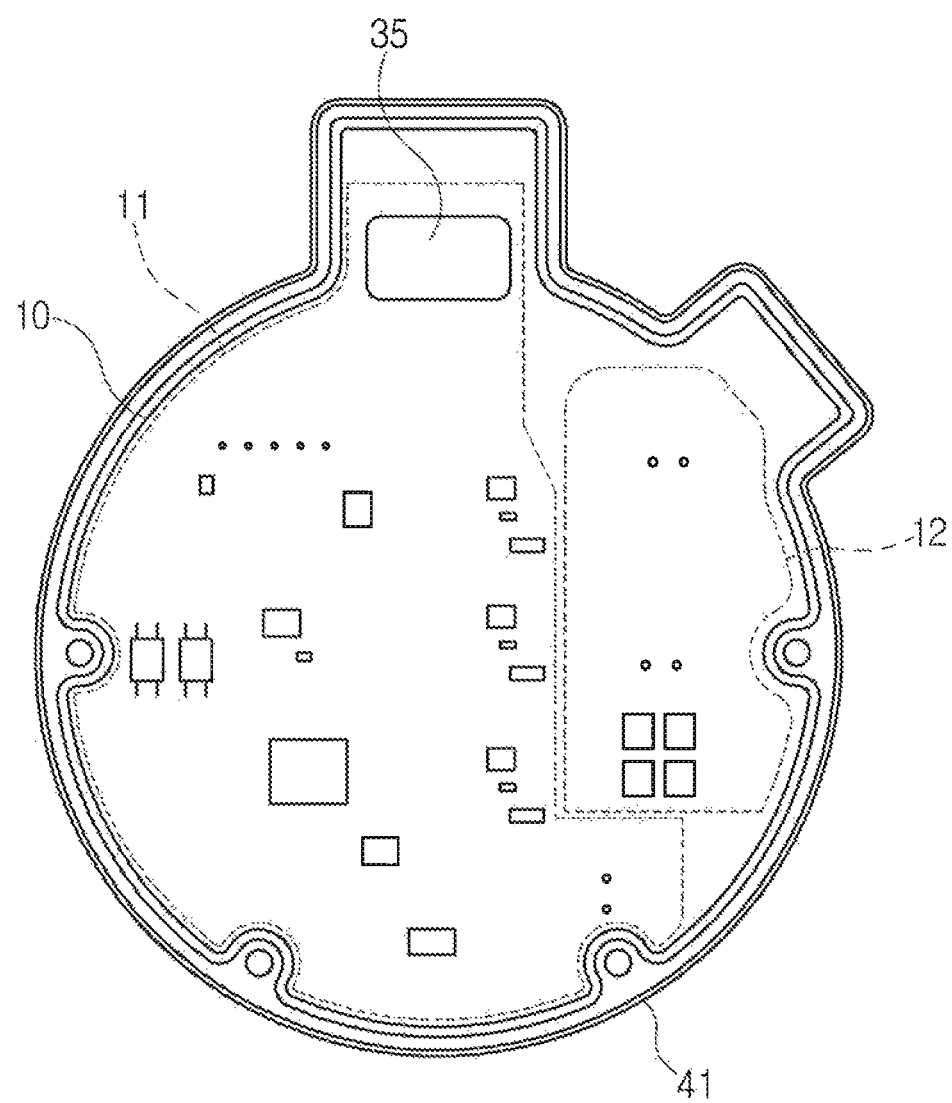
FIG. 4 is a side view taken along line A-A of FIG. 2.

As illustrated in FIG. 4, an inductor, a capacitor, a power device 30 and others are mounted on the printed circuit board 10 as a circuit element that connects or disconnects power supply to or from a motor and controls the rotation speed of the motor. The power device 30 may employ a power semiconductor such as an IGBT element. The printed circuit board 10 is provided in an inverter housing 40.

The inverter housing 40 includes a housing part 41 coupled to a compressor housing 70, and a cover part 42 covering the housing part 41. The compressor housing 70 surrounds the outside of the driving part 50 and the compressing part 60 to accommodate the driving part 50 and the compressing part 60. The housing part 41 of the inverter housing 40 is integrally formed on an end of the compressor housing 70, and the cover part 42 is detachably bolted to the housing part 41.

Figure 1:
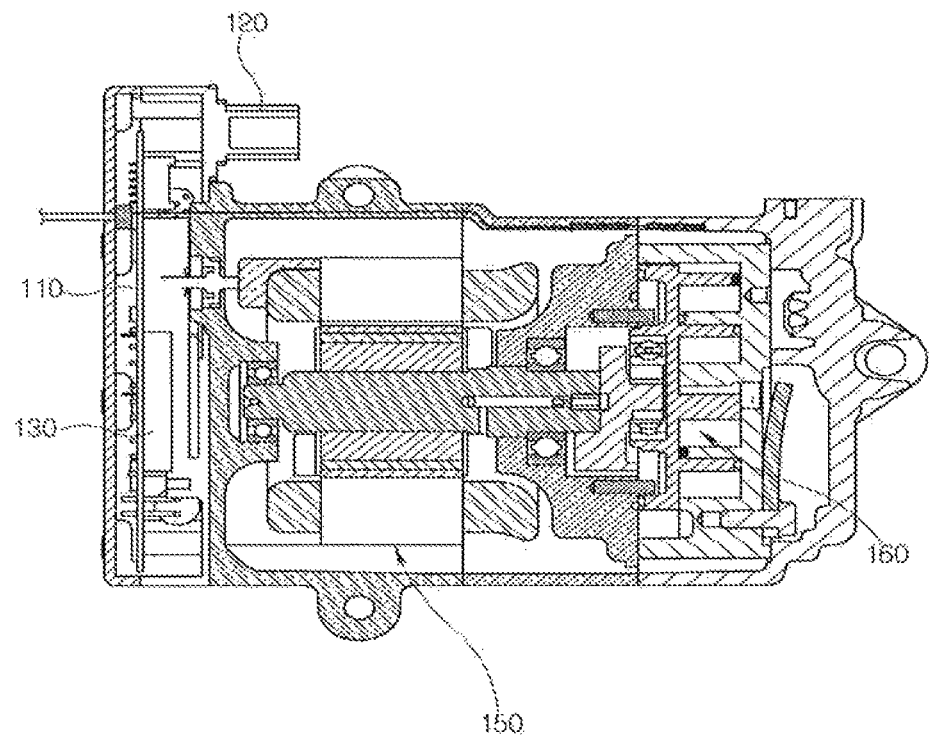
FIG. 1 is a schematic side sectional view illustrating a conventional motor-driven compressor.
Figure 2:
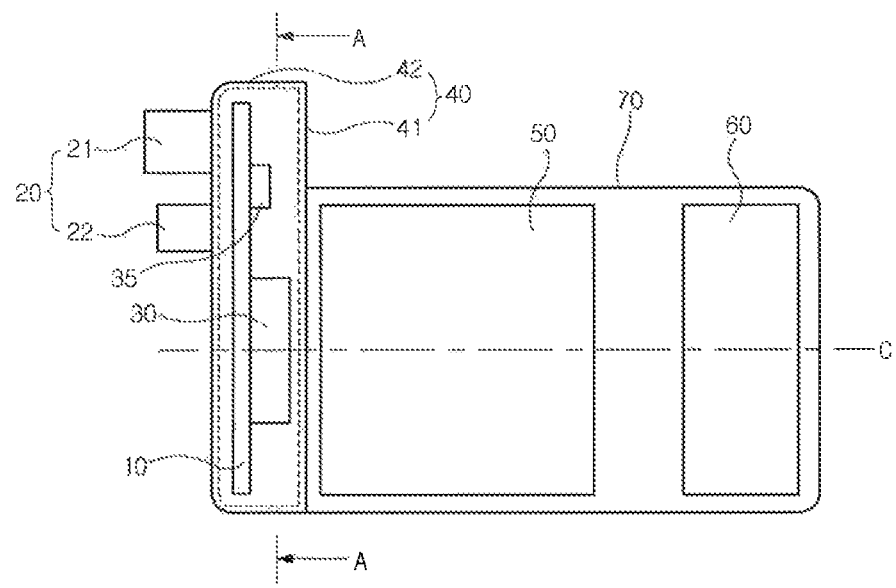
FIG. 2 is view illustrating a schematic configuration of a motor-driven compressor according to an embodiment of the present invention.

As illustrated in FIG. 4, the printed circuit board 10 is fixed to the housing part 41 via a bolt. As such, in the state where the printed circuit board 10 is fixed to the housing part 41, the cover part 42 covers the housing part 41 and then is bolted thereto. As illustrated in FIG. 2, the connector part 20 is provided outside the cover part 42. The compressing part 60 is provided in front of the driving part 50 in an axial direction of the driving part 50, while the printed circuit board 10 and the connector part 20 are provided in back of the driving part. The printed circuit board 10 is provided between the connector part 20 and the driving part 50, and the connector part 20 and the driving part 50 are provided on opposite sides of the printed circuit board 10.

The connector part 20 includes a high voltage connector 21 and a low voltage connector 22. The high voltage connector 21 and the low voltage connector 22 are electrically connected with an external power connector (not shown), and are electrically connected with the printed circuit board 10 to supply external power to components that are mounted on the printed circuit board 10.

The high voltage connector 21 and the low voltage connector 22 are fixedly coupled to the outside of the cover part 42 of the inverter housing 40 to protrude in a direction opposite to the driving part 50. That is, the high voltage connector 21 and the low voltage connector 22 extend in the direction opposite to the driving part 50 in the axial direction of the driving part 50.

As such, the high voltage connector 21 and the low voltage connector 22 are provided outside the inverter housing 40 to protrude in the direction opposite to the driving part 50. Thus, the high voltage connector and the low voltage connector become farthest from the driving part 50, so that the effect of the vibration noise of the driving part 50 is minimized.

Further, since the printed circuit board 10 is provided between the connector part 20 and the driving part 50, the noise of the driving part 50 is not transmitted to the connector part 20. The printed circuit board 10 is fabricated by making a substrate of a predetermined thickness using insulation synthetic resin and then attaching a copper foil (copper thin plate) for implementing a circuit on a surface of the substrate. Thus, the noise of the driving part 50 is cut off due to the substrate of the predetermined thickness, and the noise of the driving part 50 is also removed due to the copper foil.

The power device 30 and the high voltage filter 35 are provided to be opposite to the connector part 20 with respect to the printed circuit board 10. As illustrated in FIG. 2, the power device 30 is provided on a side of the driving part 50 with respect to the printed circuit board 10, while the high voltage connector 21 and the low voltage connector 22 are provided on an opposite side of the driving part 50.

Conventionally, the high voltage filter 35 protrudes towards the opposite side of the driving part 50 with respect to the printed circuit board 10, namely, towards the cover part 42. Thus, the cover part 42 is likewise shaped to protrude out. Hence, it is difficult to achieve compact appearance, and electromagnetic noise generated from the high voltage filter 35 is undesirably transmitted to the connector part 20.

According to the present invention, the high voltage filter 35 as well as the power device 30 is located on the opposite side of the connector part 20 with respect to the printed circuit board 10, so that the electromagnetic noise generated from the power device 30 and the high voltage filter 35 is cut off by the printed circuit board 10 and thereby is not transmitted to the high voltage connector 21 and the low voltage connector 22.

Consequently, the high voltage connector 21 and the low voltage connector 22 protrude towards the opposite side of the driving part 50 with respect to the printed circuit board 10, thus minimizing the effects of both the vibration noise from the driving part 50 and the electromagnetic noise from the power device 30.

Figure 3:
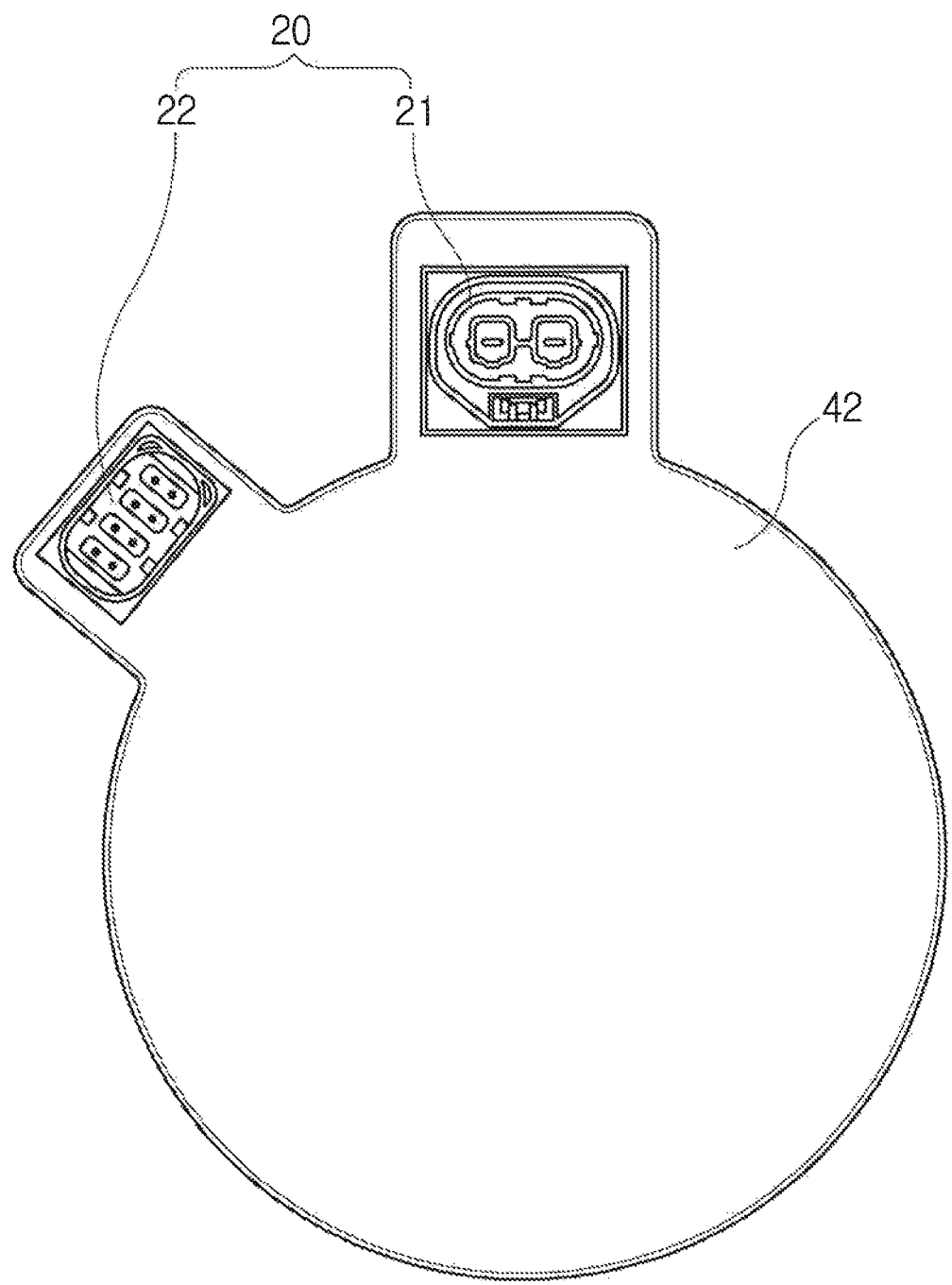
FIG. 3 is a left side view illustrating the motor-driven compressor of FIG. 2.

Meanwhile, as illustrated in FIG. 3, the connector part 20 is provided outside the outer surface of the driving part 50 with respect to a rotation center C of the driving part 50. The high voltage connector 21 as well as the low voltage connector 22 is provided beyond an outer diameter of the driving part 50, thus reducing noise transmission from the driving part 50.

That is, the high voltage connector 21 and the low voltage connector 22 are provided at a position beyond a noise region of the driving part 50 radiated in the direction of the rotation center C that is the axial direction of the driving part 50, so that the high voltage connector and the low voltage connector are less affected by the noise as compared to a case where they are within a radius of the driving part 50.

In conclusion, the high voltage connector 21 and the low voltage connector 22 of the present invention are provided outside the printed circuit board 10, and are provided beyond the outer diameter of the driving part 50, thus reducing the effects of both the vibration noise of the driving part 50 and the electromagnetic noise of the power device 30, and thereby preventing noise from being transmitted from the driving part 50 through the high voltage connector 21 and the low voltage connector 22 to the external power source (battery) or minimizing the transmission of the noise.

Further, as illustrated in FIG. 2, the high voltage connector 21 and the low voltage connector 22 protrude towards the opposite side of the driving part 50 with respect to the printed circuit board 10 to be provided outside the inverter housing 40, thus allowing the assembling direction of the connector to be easily designed.

Figure 5:
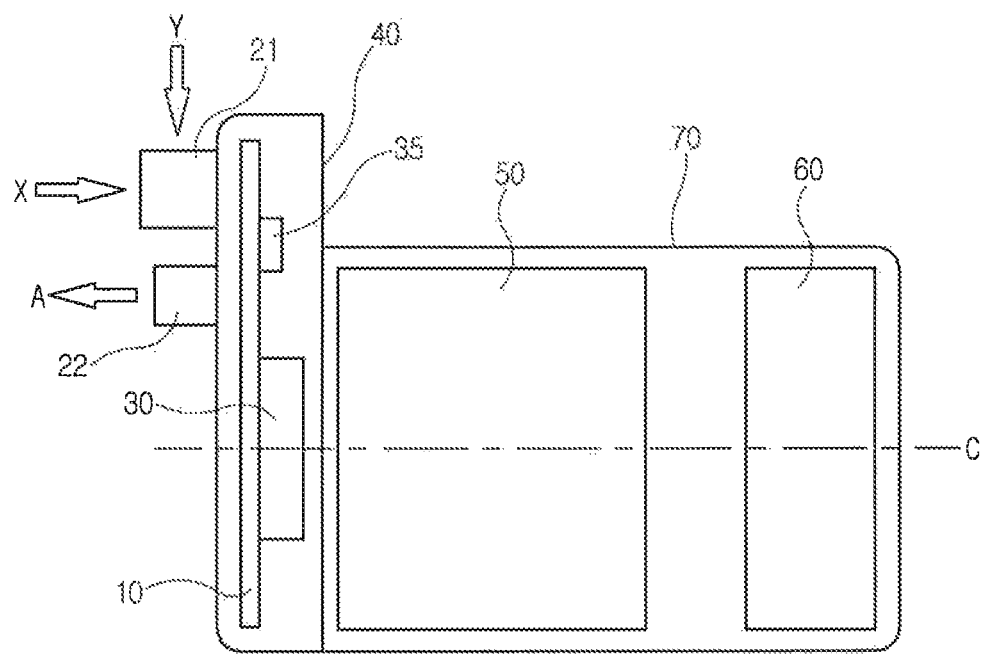
FIG. 5 is a conceptual view illustrating the assembling direction of an inverter shown in FIG. 2.

For example, as illustrated in FIG. 5, ports of the high voltage connector 21 and the low voltage connector 22 may be formed in a direction A to allow an external connector to be fitted in a connector protruding direction A and an opposite direction X. Further, the ports of the high voltage connector 21 and the low voltage connector 22 may be formed in a direction Y to allow the external connector to be fitted in the direction Y crossing the connector protruding direction A.

As the high voltage connector 21 and the low voltage connector 22 are formed to protrude out of the inverter housing 40, the assembling direction may be designed in any direction such as the direction X or Y or may be easily changed when the external connector is assembled with the high voltage connector 21 and the low voltage connector 22.

Referring to FIGS. 3 and 4, the low voltage connector 22 is provided on either a left side or a right side of the high voltage connector 21, and is provided at a position where the low voltage part 12 is located, among the high voltage part 11 and the low voltage part 12 provided on the printed circuit board 10.

FIG. 3 is a side view when seen from a left of FIG. 2, and FIG. 4 is a side view when seen in a direction opposite to FIG. 3. Thus, in FIG. 3, the low voltage connector 22 is located on the left side of the high voltage connector 21. In FIG. 4 seen in the opposite direction, the low voltage connector 22 is located on the right side of the high voltage connector 21.

As illustrated in FIG. 4, electric elements including the inductor, the capacitor, the power device 30, and the high voltage filter 35 mounted on the printed circuit board 10 may be divided into the high voltage part 11 and the low voltage part 12. That is, upon designing a printed circuit, the elements are grouped as high voltage elements and low voltage elements.

The high voltage connector 21 applies power to the high voltage part 11 made by collecting the high voltage elements, while the low voltage connector 22 applies power to the low voltage part 12 made by collecting the low voltage elements, Thus, the low voltage connector 22 is disposed adjacent to the low voltage part 12. That is, the low voltage connector 22 is provided on any one side with respect to the high voltage connector 21 depending on the position of the low voltage part 12. For example, as illustrated in FIG. 4, when the low voltage part 12 is located on the right side of the high voltage part 11, the low voltage connector 22 is also provided on the right side of the high voltage connector 21. Where the design of the low voltage part 12 is changed such that its position is set reversely, the position of the low voltage connector 22 is likewise changed reversely.

Figure 6:
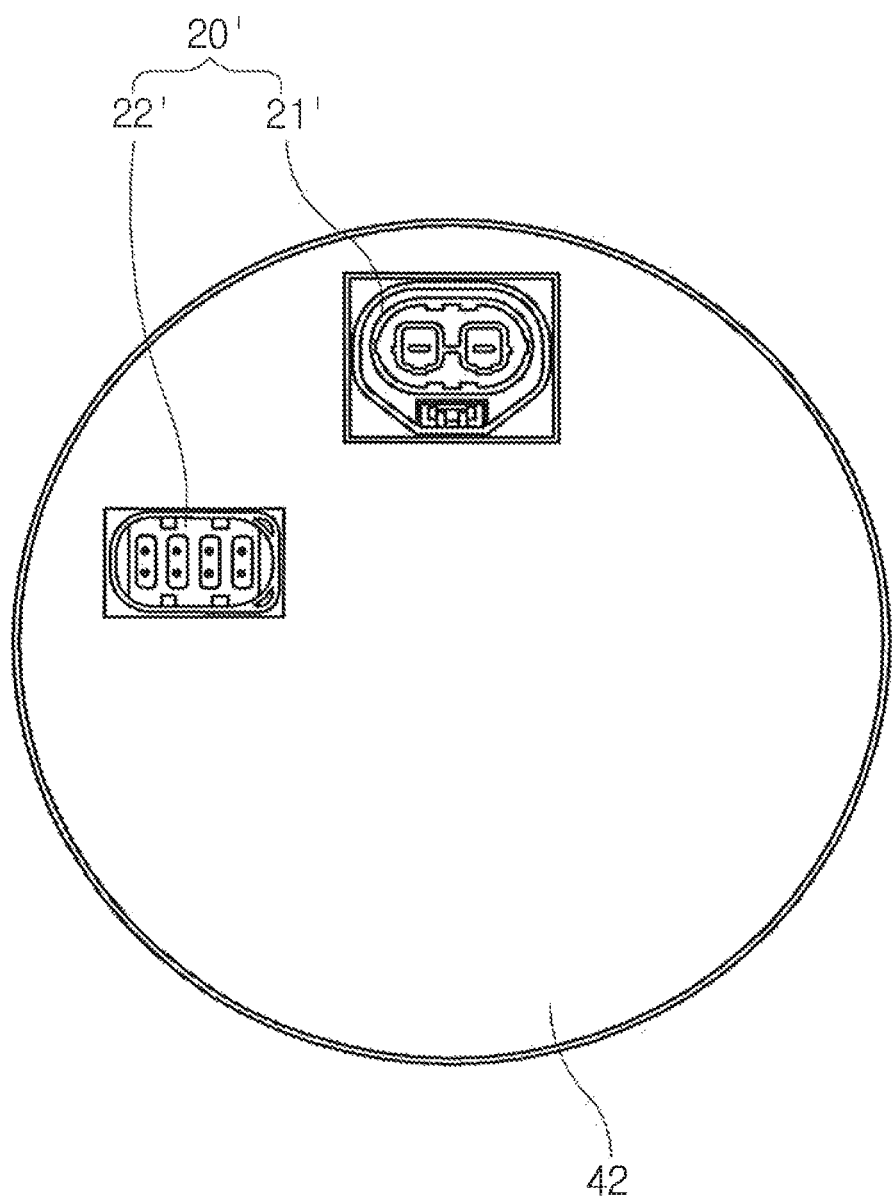
FIG. 6 is a side view illustrating a motor-driven compressor according to another embodiment of the present invention.

Meanwhile, as illustrated in FIG. 6, a connector part 20' may be provided inside the outer diameter of the cover part 42. That is, in FIG. 6, a high voltage connector 21' and a low voltage connector 22' are provided inside the outer surface of the driving part 50 with respect to the rotation center C of the driving part 50.

This is higher in the influence of noise than the connector part 20 illustrated in FIG. 3, but is smaller in occupied space than the connector part. In the case of the embodiment illustrated in FIG. 3, the connector part 20 protrudes beyond the outer diameter of the cover part 42, so that the entire volume of the inverter is increased as compared to the embodiment illustrated in FIGS. 6 and 7. In other words, the structure of the connector part 20' illustrated in FIGS. 6 and 7 may be more compact than the structure of the embodiment illustrated in FIG. 3.

Figure 7:
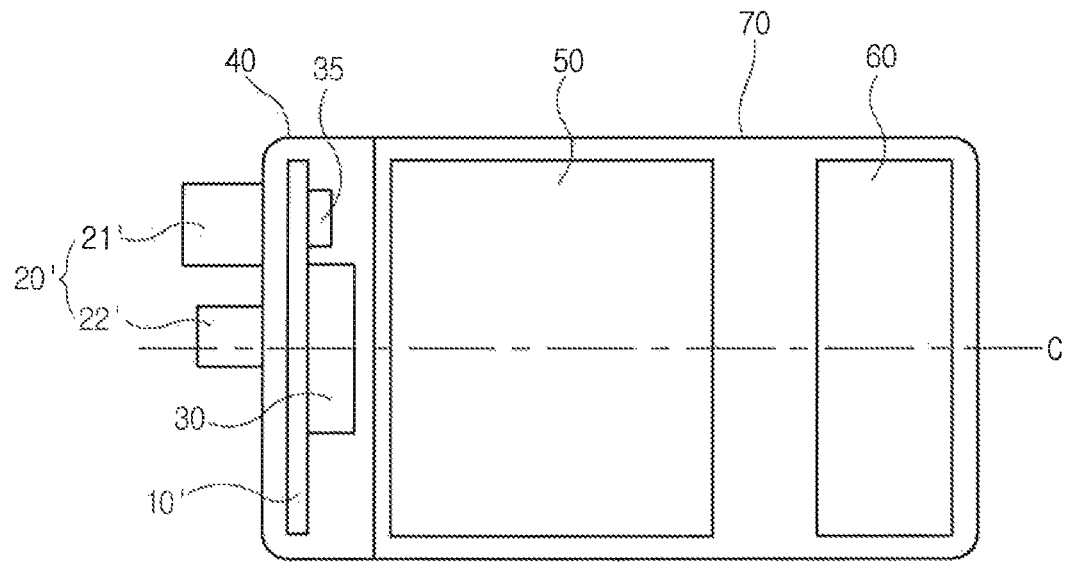
FIG. 7 is a right side view illustrating the motor-driven compressor of FIG. 6.

Meanwhile, in the case of the embodiment illustrated in FIGS. 6 and 7, the connector part 20' is provided inside the printed circuit board 10' in a direction crossing the rotation center C of the driving part 50. In this case, the printed circuit board 10' completely covers the connector part 20' from the driving part 50, so that the connector part 20' is completely shielded by the printed circuit board 10' without being exposed to the driving part 50. The same applies to the embodiment illustrated in FIGS. 3 and 4. That is, the printed circuit board 10 extends to the backs of the high voltage connector 21 and the low voltage connector 22, so that the high voltage connector 21 and the low voltage connector 22 are completely shielded by the printed circuit board 10.

Figure 8:
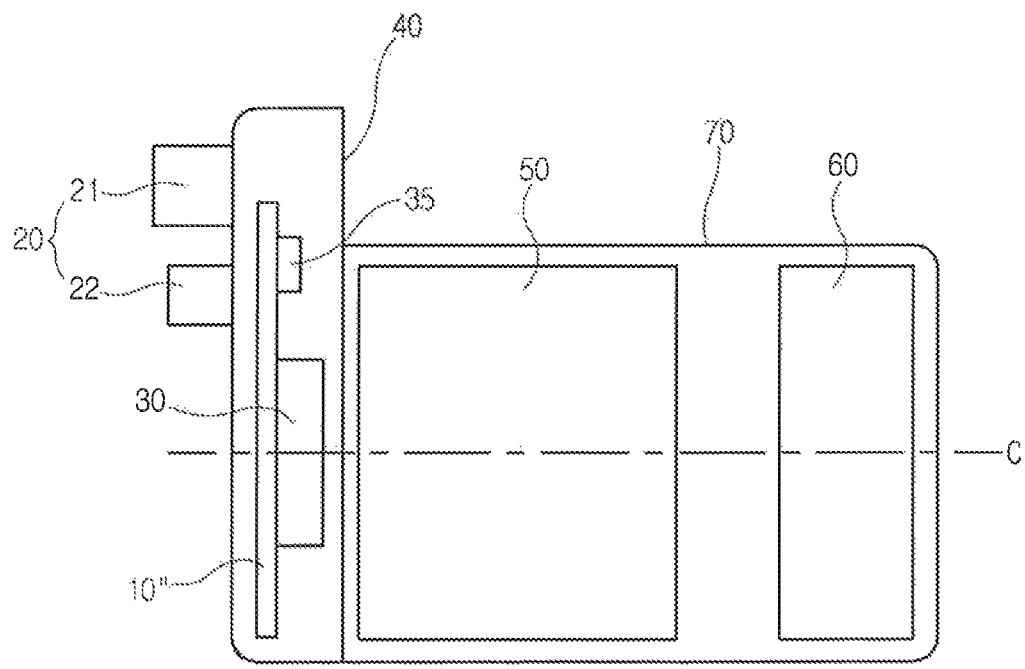
FIG. 8 is a side view illustrating a motor-driven compressor according to a further embodiment of the present invention.

FIG. 8 illustrates an embodiment where the connector part 20 protrudes out of the printed circuit board 10 in a direction crossing the rotation center C of the driving part 50.

Referring to FIG. 8, a printed circuit board 10" is formed to be smaller than that of FIG. 2 so that it does not completely cover but partially covers the backs of the high voltage connector 21 and the low voltage connector 22. In this case, the high voltage connector 21 and the low voltage connector 22 are not completely shielded but are partially covered by the printed circuit board 10". As such, the present invention embraces the embodiment where the connector part 20 is partially covered by the printed circuit board 10".

Although some detailed embodiments of the present invention have been described above, the embodiments have been provided to describe the present invention in detail, and the present invention is limited to the embodiments. It is evident to those skilled in the art that the present invention may be modified or improved within the technical spirit of the present invention.

Such a simple modification or change of the present invention falls within the scope of the present invention, and a detailed scope of the present invention will become evident by the appended claims.

INDUSTRIAL APPLICABILITY

As described above, the present invention provides a motor-driven compressor with an inverter that is connected with an external power source via a connector part and controls a driving part which drives a compressing part to compress fluid, thus minimizing noise transmitted from a motor or a power device through a connector and a harness to an external device.

The invention claimed is:

1. A motor-driven compressor comprising: an inverter that is connected with an external power source via a connector part and controls a driving part which drives a compressing part to compress fluid,
   wherein a printed circuit board is provided between the connector part and the driving part,
   wherein a power device and the connector part are provided on the printed circuit board at opposite sides thereof,
   wherein the power device employs a power semiconductor,
   wherein the connector part is provided outside an outer surface of the driving part with respect to a rotation center of the driving part,
   wherein the power device is provided inside the outer surface of the driving part, and
   wherein the connector part is radially spaced apart from the power device.

2. The motor-driven compressor of claim 1, wherein the connector part extends in an axial direction of the driving part and protrudes towards an opposite side of the driving part.

3. The motor-driven compressor of claim 2, wherein the compressing part is provided in front of the driving part in the axial direction of the driving part, and the printed circuit board and the connector part are provided in back of the driving part.

4. The motor-driven compressor of claim 2, wherein a high voltage filter and the connector part are provided on opposite sides of the printed circuit board.

5. The motor-driven compressor of claim 1, wherein the printed circuit board is provided in an inverter housing,
   the inverter housing comprises a housing part coupled to a compressor housing, and a cover part covering the housing part, and
   the connector part is provided on the cover part of the inverter housing.

6. The motor-driven compressor of claim 1, wherein the connector part comprises a high voltage connector and a low voltage connector.

7. The motor-driven compressor of claim 6, wherein the low voltage connector is provided on either a left side or a right side of the high voltage connector.

* * * * *